(12) United States Patent
Lamberts et al.

(10) Patent No.: US 6,469,855 B1
(45) Date of Patent: Oct. 22, 2002

(54) METHOD AND SYSTEM FOR ADAPTIVE SETTLE AND WRITE INHIBIT CONSTRAINTS BASED ON HEAD GEOMETRY AND SERVO/MECHANICAL SYSTEM

(75) Inventors: Bernd Lamberts, Cupertino, CA (US); Mantle Man-Hon Yu, San Jose, CA (US); Louis Joseph Serrano, San Jos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/302,550

(22) Filed: Apr. 30, 1999

(51) Int. Cl.[7] .......................... G11B 15/04; G11B 5/02; G11B 5/09

(52) U.S. Cl. ............................. 360/60; 360/25; 360/75

(58) Field of Search .................. 360/60, 75, 77.02, 360/77.08, 78.14, 25, 31, 53, 46

(56) References Cited

U.S. PATENT DOCUMENTS

| | | | |
|---|---|---|---|
| 5,270,880 A | 12/1993 | Ottesen et al. | 360/60 |
| 5,570,244 A | 10/1996 | Wiselogel | 360/60 |
| 5,617,536 A | 4/1997 | Freitas et al. | 360/78.14 |
| 5,684,650 A | 11/1997 | Kadlec et al. | 360/77.06 |
| 5,793,555 A | 8/1998 | Belser et al. | 360/75 |
| 5,796,543 A | 8/1998 | Ton-That | 360/77.08 |
| 5,844,742 A | 12/1998 | Yarmchuk et al. | 360/75 |
| 5,880,902 A | 3/1999 | Yu et al. | 360/77.04 |
| 6,061,197 A | * 5/2000 | Wiselogel | 360/60 |

* cited by examiner

Primary Examiner—Regina N. Holder
(74) Attorney, Agent, or Firm—Sawyer Law Group LLP

(57) ABSTRACT

A method and system in accordance with the present invention for minimizing the loss of data by a write head is disclosed. The method comprises providing a desired write head width based upon a hard error rate. The method further comprises adjusting at least one parameter of the servo control logic based upon a comparison of the width of the write head and the desired write head width, wherein the write head will not exceed the hard error rate when writing data. Through the use of a system and method in accordance with the present invention a servo system can be designed based on a constant hard error rate. The write inhibit window and the settle delay for writing operations in a servo system will be optimized, based on the hard error rate, for each individual head in the disk drive configuration. This will increase the speed of the servo process without affecting the reliability of the data.

28 Claims, 5 Drawing Sheets

METHOD AND SYSTEM FOR ADAPTIVE SETTLE AND WRITE INHIBIT CONSTRAINTS BASED ON HEAD GEOMETRY AND SERVO/MECHANICAL SYSTEM

FIELD OF THE INVENTION

The present invention relates to read-write data storage devices and particularly to a method and system for defining write inhibit constraints and settle delay based on head geometry.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks that extend circumferentially around the disk. Each data track stores data in the form of a series of variations in disk surface magnetic orientation recorded laterally in the tracks. A magnetic read/write head suspended over the disk surface transduces the variations in magnetic orientation and produces a readback signal. The magnetic read/write head detects the variations in magnetic orientation and generates the readback signal as the disk rotates relative to the read/write head at thousands of revolutions per minute.

Conventionally, the read/write head is mounted on an actuator arm that is moved by a servo. A disk drive servo control system controls movement of the arm radially across the disk to move the read/write head from track to track in a seek. The servo control system produces a position error signal (PES) which provides fine position control for the disk. servo arm. Once the head is over a selected track, the servo control system maintains the head in a path over the track in a track following operation. Preferably, the head should be centered over the centerline of the magnetic transitions of the data track. If the head is not centered properly, the head may transduce transitions from the wrong track and create memory or data storage failure. What all systems ultimately try to avoid is the non-recoverable loss of data (the "hard error"). The rate at which the hard error occurs (hard error rate) should be as close to zero as possible. Consequently, the design parameters are selected conservatively.

One of the most crucial parameters of conventional read/write head design relates to the write inhibit windows. The write inhibit window is a measurement of how far off track the servo will permit the head to drift before interrupting the write operation. Somewhat farther from track center than this is the threshold at which adjacent track damage occurs. The write inhibit window is selected so that for all heads, there is sufficient margin between the window and the threshold of damage. Accordingly, the write inhibit window must be selected conservatively. However, the conservative nature of this choice can reduce performance on the many heads that could well operate within a wider window without the risk of adjacent track damage.

Combined with the risk of adjacent track damage is the risk of reading "old information", or data that should have been overwritten by a prior operation. If the head is off track while writing, not only may it cause damage to an adjacent track, but the new information may not fully replace the old information. In this case, there is a risk that if the head moves off track in the other direction on a subsequent operation, it may recover the old data, instead of the new, correct information. This can also drive the write inhibit threshold.

A second window that is used to prevent recovering old information is a read inhibit window. The old information is probably substantially displaced from track center, so the head must be substantially off track to read it. Although an off track read cannot damage the information on the disk, it can recover this old information. Consequently, this can drive values for the read and write inhibit windows that are picked for the worst case head, while many heads could operate with wider windows.

Another important aspect of the servo process is the settle delay. The settle delay can be defined as the time from when the seek operation completes until the data transfer can reliably be executed. Factors that increase the settle delay are mechanical vibration induced by the seek operation, external vibrations induced by adjacent drives seeking, fans running, high temperature or low voltage to the drive, etc. Since such factors can't be accounted for ahead of time, the settle delay is conservatively selected to ensure the reliability of the data transfer operation. For example, if the actuator vibrates sufficiently, then the head can write off track even with a conservative write inhibit window. This is because the position is sampled in time, and therefore the write inhibit window can only be set at specific instances. Consequently, larger write heads will require tighter write inhibit windows and/or longer settle delays to avoid the risk of adjacent track damage.

Based on the exponential growth of disk drive technology, there exists a two-fold desire to make the servo process perform as fast as possible while ensuring the reliability of the data being generated. As computer systems become bigger and bit densities and track densities are increased, the speed and accuracy of the servo system becomes even more important. What is also important is the hard error rate of the system since many applications differ in their requisite degree of precision. It is therefore desirable that servo systems become faster and more reliable in their ability to process data. It is also desirable that systems are designed based upon a pre-calculated constant hard error rate. The present invention addresses such a need.

SUMMARY OF THE INVENTION

A method and system in accordance with the present invention for minimizing the loss of data by a write head is disclosed. The method comprises providing a desired write head width based upon a hard error rate. The method further comprises adjusting at least one parameter of a servo control logic based upon a comparison of the width of the write head and the desired write head width, wherein the write head will not exceed the hard error rate when writing data.

Through the use of a system and method in accordance with the present invention a servo system can be designed based on a constant hard error rate. The write inhibit window and the settle delay for writing operations in a servo system will be optimized, based on the hard error rate, for each individual head in the disk drive configuration. This will increase the speed of the servo process without affecting the reliability of the data.

DETAILED DESCRIPTION

The present invention provides a method and system for defining write inhibit constraints and settle delay in read-write data storage devices based on head geometry. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
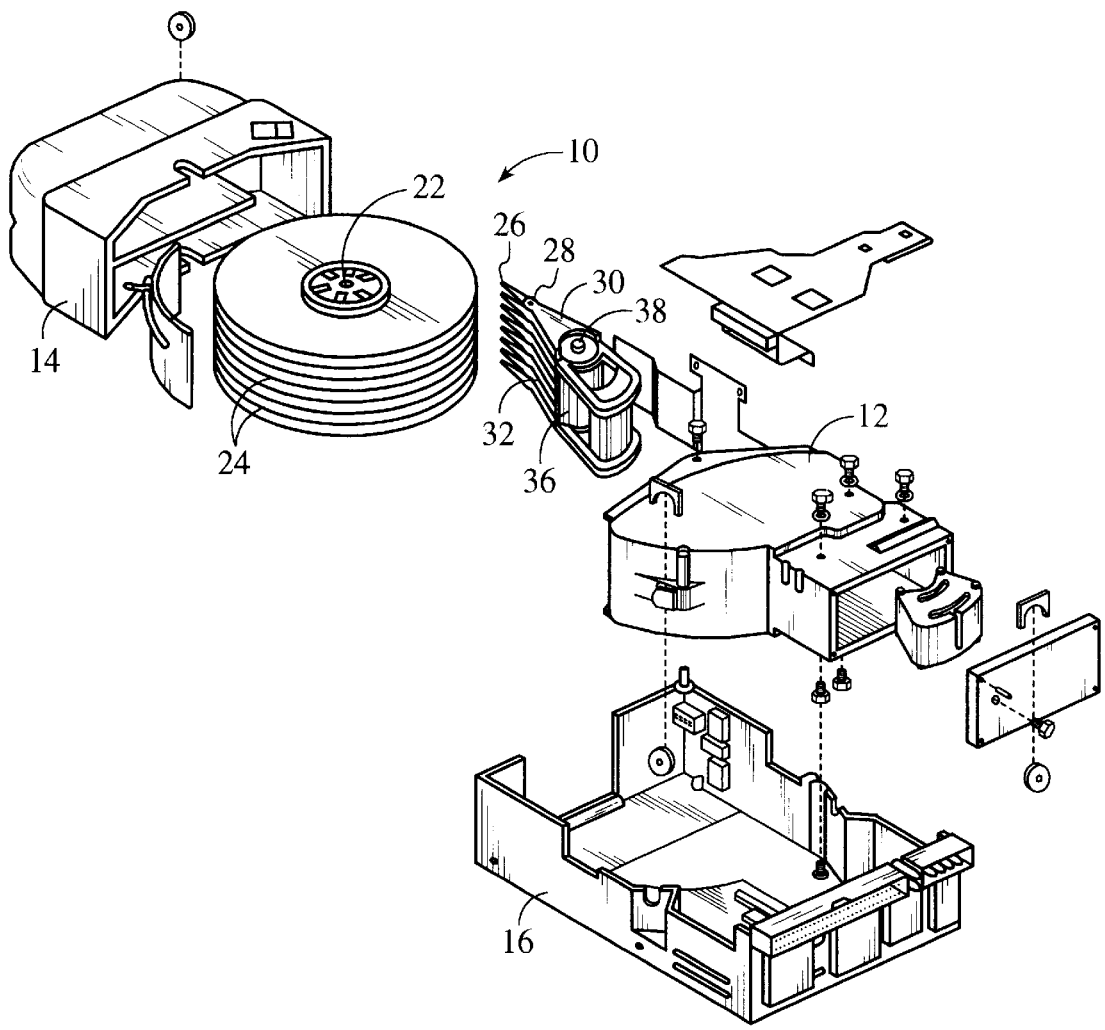
FIG. 1 is a view of a magnetic storage system.

FIG. 1 depicts a magnetic storage system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Preferably, sliders in accordance with the invention are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly across the surface of the storage disk 24. However, the invention is not meant to be limited to the disk drive described above. Those skilled in the art will recognize that defining write inhibit constraints and settle delay in read-write data storage devices based on head geometry according to the present invention may be implemented with any configuration of disk drive or direct access storage device (DASD).

Figure 2:
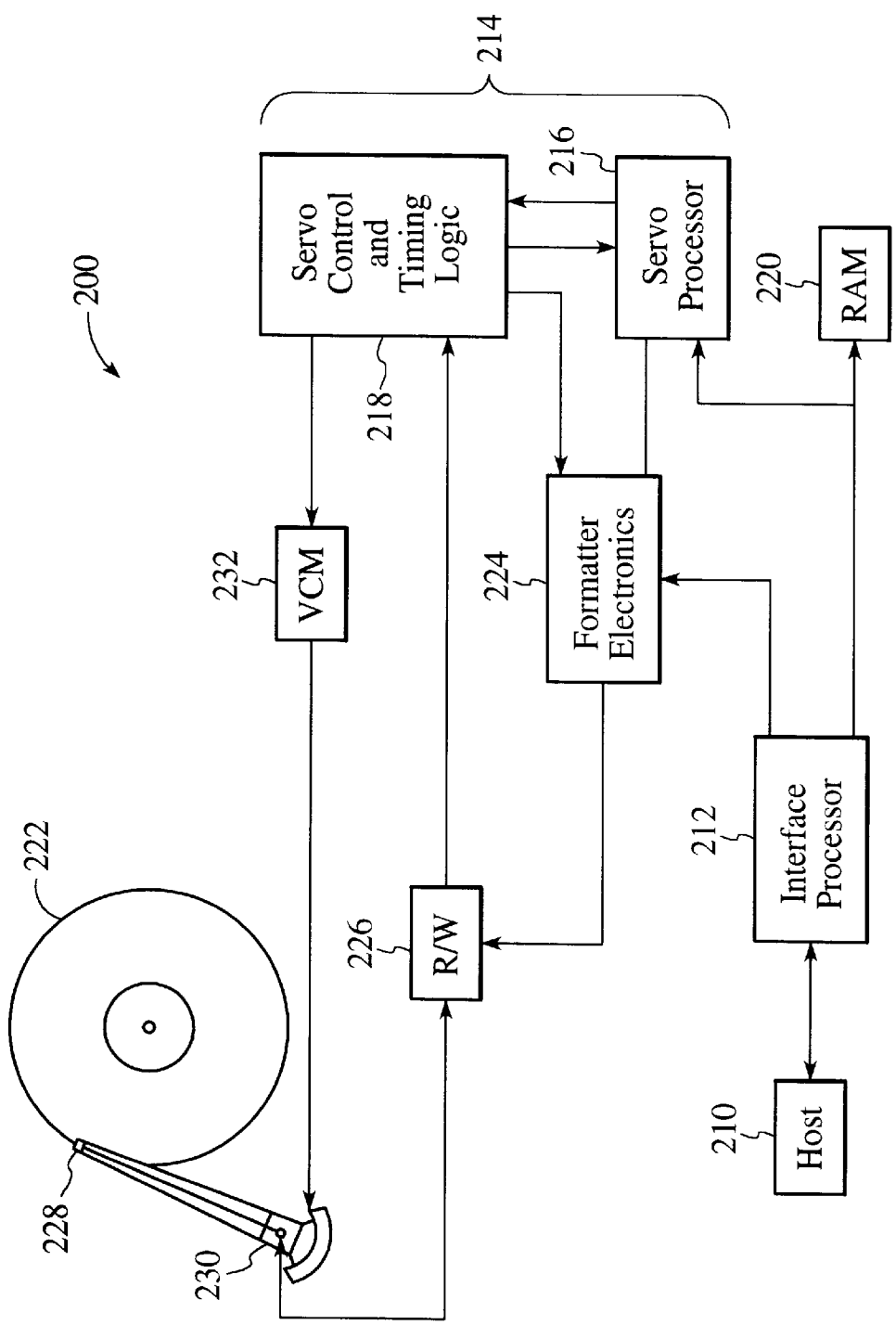
FIG. 2 illustrates a block diagram of a computer disk drive system.

FIG. 2 shows a block diagram of a computer disk drive system 200 suitable for practicing the invention. A host computer system 210 is coupled to an interface processor 212 linking the host system 210 to a servo controller 214. The servo controller 214 includes a servo processor 216 and servo control and timing logic 218. Data parameters may be stored in random access memory (RAM) 220 or on the disk itself 222. The servo processor 216 is attached at the opposite end of the interface processor 212 and receives commands across the interface processor 212 from the host system 210.

Data to be written to the disk 222 is routed to the formatter electronics 224. The read/write circuit 226 conditions the data and routes the data to the head 228 at the end of the actuator arm 230 for writing to the disk 222. Data read from the disk 222 by the head or sensor 228 is received by the read/write circuit 226. The data received from the head 228 is conditioned by the read/write circuit 226 to provide a read pulse output. The read pulse output is then routed to the formatter electronics 224 for processing before being provided to the host 210 via the interface processor 212.

The servo processor 216 provides control signals to the servo control and timing logic 218. The servo control and timing logic 218 interprets the control signals from the servo processor 216 and sends voice coil control signals to the voice coil motor driver 232. The voice coil motor driver 232 drives the actuator arm 230 in accordance with the control signals. The actuator arm 230 supporting the magnetic head 228 is driven by the voice coil motor driver 232 to move the magnetic head 228 to a target track position on the disk 222. The servo control and timing logic 218 outputs to the servo processor 216 position data indicative of the track position corresponding to the current position of the magnetic head 228 from servo data read out from disk 222.

Figure 3:
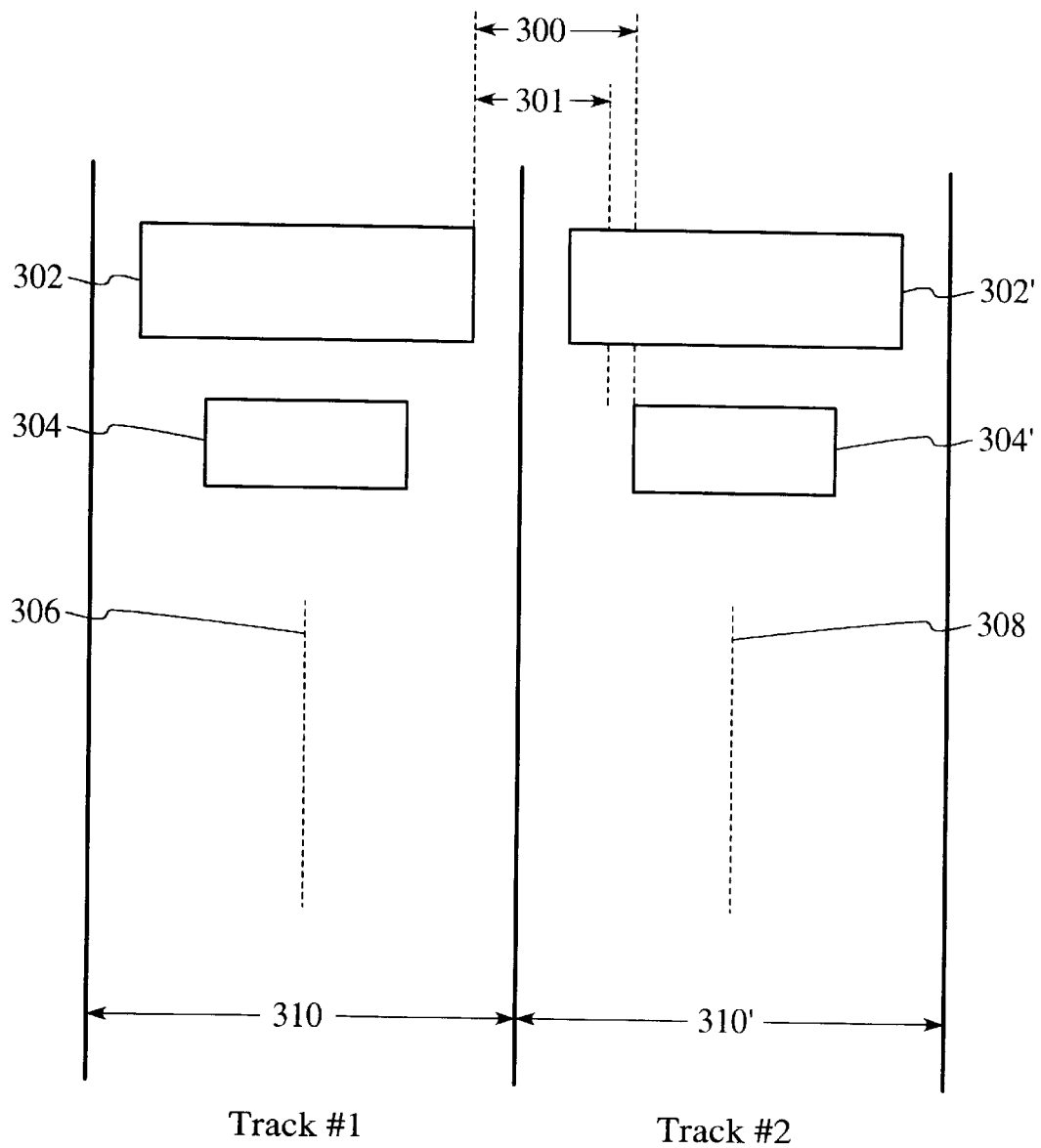
FIG. 3 is a view of two adjacent data tracks in a disk drive system.

To more specifically understand the method and system of the present invention refer now to the following detailed description of a preferred embodiment of a method in accordance with the present invention along with the accompanying FIG. 3. Track #1 and Track #2 represent two adjacent data tracks. The distances 310, 310' represent the corresponding width of each track (track pitch). The write width 302 and read width 304 are depicted as being centered over the tracks. The distance 300 represents the write damage threshold. This is the distance that the head can go off center from a track during a write operation without affecting the portion of the adjacent data track traversed by a read gap during a read at the adjacent track. In other words, if during a write to Track #1, the head moves off center 306 with respect to Track #1 towards Track #2, any transitions falling within the radial extent of Track #2 will not affect data integrity so long as the transitions are outside of the radial extent of the read width of Track #2. The write inhibit window 301 is selected whereby there is sufficient margin between the write inhibit window 301 and the write inhibit threshold 300 to ensure data reliability.

The settle delay is also an important aspect of this process. In order to achieve optimum performance in the disk drive configuration, the settle delay for each particular head is determined as a function of the individual write head dimensions. The settle delay needed for the actuator to ensure that the write head on track is inversely proportional to the write inhibit window 301. Accordingly, as the write inhibit window 301 increases, the settle delay decreases.

During product testing, a constant probability of creating damage to the tracks (a hard error rate) during the write process can be determined based on a particular write head width. Consequently, a hard error rate can be chosen to accommodate particular application needs. Based on the hard error rate chosen, the corresponding write head width is retrieved. Associated with this write head width is a write inhibit window and a settle delay. However, during product manufacturing, the actual width of a particular head will vary slightly from the desired width. Accordingly, the write inhibit window and settle delay are adjusted to maintain the chosen hard error rate.

Figure 4:
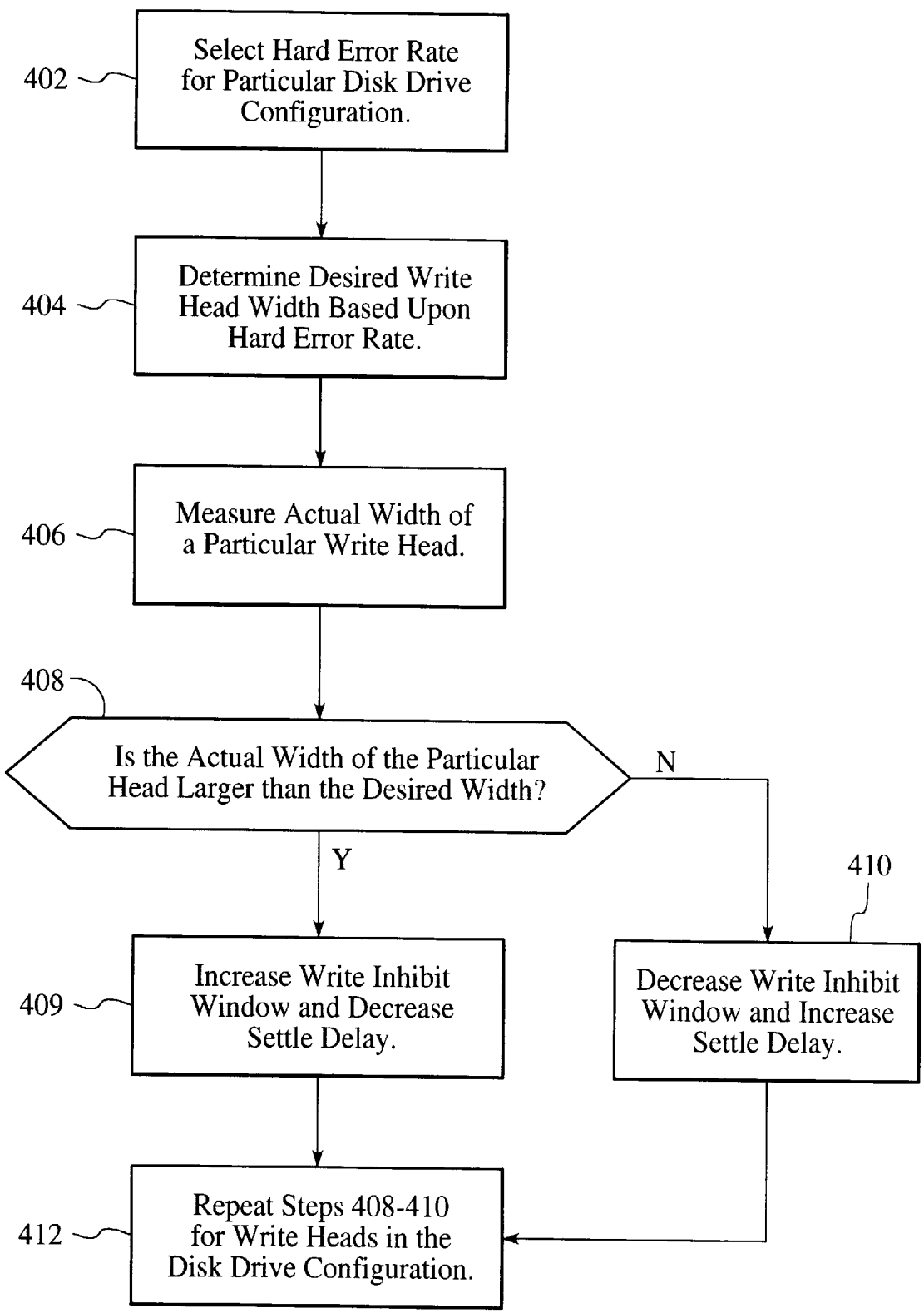
FIG. 4 is a flowchart of the method in accordance with the present invention.

FIG. 4 is a flowchart of the method in accordance with the present invention. First, a hard error rate is selected for the particular disk drive configuration, via step 402. Based on this rate, a desired write head width is determined, via step 404. Next, the actual width of a particular write head in the disk drive configuration is determined, via step 406. This measurement can be performed in a variety of ways by the hardware and software and preferably takes place in the servo control and timing logic 214 of FIG. 2.

Figure 5:
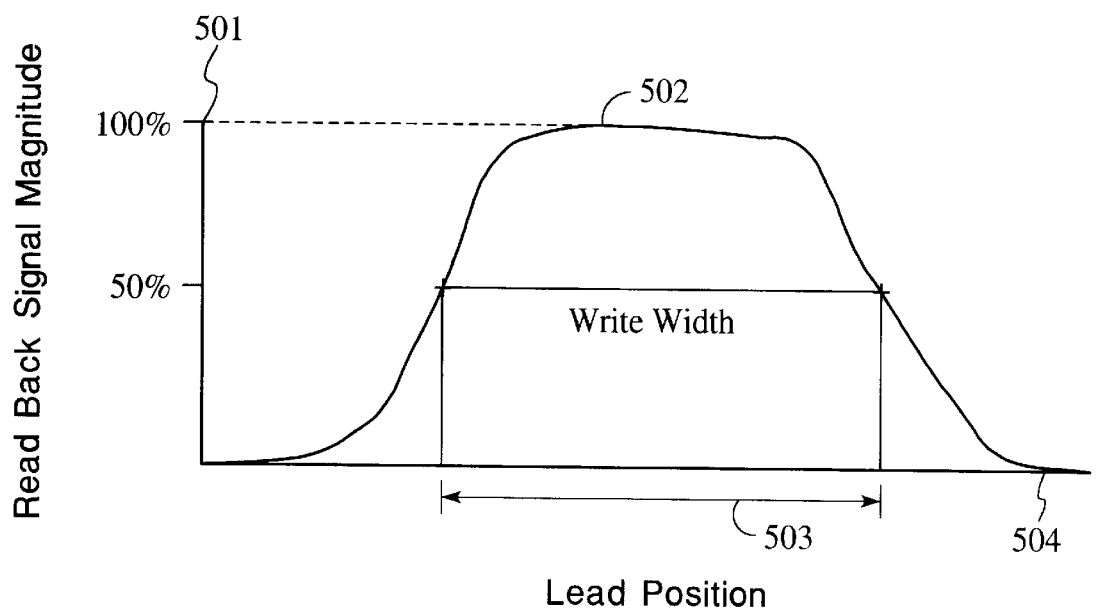
FIG. 5 illustrates a typical graph of a readback signal used to measure write head widths in a servo system.

To more particularly describe an example of measuring a write head width in a disk drive assembly, refer now to the following discussion in conjunction with FIG. 5. FIG. 5 is a diagram of magnitude of a readback signal vs. write head position. Initially, an erased region on the disk is identified by the write head sensing that there is a zero data signal.

Next, a data signal is written into the erased region. The head is then offset far enough so that the data signal cannot be sensed by the head. The magnitude of the readback signal is measured by an envelope detector which is typically located in the servo control and timing logic 214. The write head is then offset a small distance. Initially, the signal will increase in magnitude as more of the write head senses the signal. Eventually the write head will start moving off of the written pattern, and the signal size will decrease to zero again. The magnitude 501 and the distance 504 of the readback signal are recorded continuously through the write head movement. From this data, the write width is the distance 503 the write head moves from when the readback signal first increases to half of its maximum value 502, until it decreases back to half of its original value. This process can then be repeated for each of the write heads in the disk drive 10. One of ordinary skill in the art will readily recognize that different methods can be utilized to measure write head widths in a servo system. These alternative methods would also be within the spirit and scope of the present invention.

Referring back to FIG. 4, it is determined whether the actual width of the particular head is larger than the desired width, via step 408. If the actual width of a particular write head in the disk drive configuration is larger than the write head width that corresponds to the chosen hard error rate, then the write inhibit window for that particular write head is decreased and the settle delay is increased in order to not exceed the selected hard error rate, via step 409. If the actual width of a particular write head in the disk drive configuration is smaller than the write head width that corresponds to the chosen hard error rate, then the write inhibit window for that particular write head is increased and the settle delay is decreased in order to not exceed the selected hard error rate via step 408. Steps 408–410 are repeated for every write head in the disk drive configuration.

For example, a chosen hard error rate may correspond to a write head width that is 85% of the track pitch. This width may have a corresponding write inhibit window of 15% of the track pitch. This width also has a corresponding settle delay. However, if the actual width of the write head is 90% of the track pitch, the write inhibit window must be decreased and the settle delay must be adjusted to account for the larger write head. Furthermore, if the actual width of the write head is 80% of the track pitch, the write inhibit window can be increased and the settle delay can be decreased.

Although the present invention has been described wherein the write inhibit window and settle delay can be adjusted based on a pre-calculated hard error rate, one of ordinary skill in the art will readily recognize that other parameters can be altered as well and these alterations would be within the spirit and scope of the present invention. For example, based on a given position error signal, a write inhibit can be posted if the predicted position exceeds a given threshold. Accordingly, the threshold can be adjusted based on head geometries. Therefore, many modifications may be made by one of ordinary skill in the art without departing from the spirit and scope of the appended claims.

What is claimed is:

1. A method for minimizing the loss of data by a disk drive configuration, the disk drive configuration including at least one write head and a servo control logic, the method comprising the steps of:

(a) providing a desired write head width based upon a hard error rate; and (b) adjusting at least one parameter of the servo control logic based upon a comparison of the width of the at least one write head and the desired write head width, wherein the at least one write head will not exceed the hard error rate when writing data.

2. The method of claim 1 wherein the at least one parameter includes a plurality of parameters.

3. The method of claim 2 wherein the plurality of parameters include a write inhibit window and a settle delay.

4. The method of claim 1 in which the providing step (a) comprises:

(a1) selecting a hard error rate for a particular disk;

(a2) determining a desired write head width based upon the hard error rate.

5. The method of claim 4 in which the adjusting step (b) comprises:

(b1) comparing actual width of the at least one write head to the desired write head width; and (b2) adjusting the parameters if the actual width is substantially different from the desired width.

6. The method of claim 5 wherein the at least one parameter includes a plurality of parameters.

7. The method of claim 6 wherein the plurality of parameters include a write inhibit window and a settle delay.

8. The method of claim 7 wherein if the actual width is larger than the desired width the write inhibit window is increased and the settle delay is decreased.

9. The method of claim 7 wherein if the actual width is smaller than the desired width, the write inhibit window is decreased and the settle delay is increased.

10. A method for minimizing the loss of data by a disk drive configuration, the disk drive configuration including a plurality of write heads and a servo control logic, the method comprising the steps of:

(a) providing a desired write head width based upon a hard error rate; and (b) adjusting a write inhibit window and a settle delay of the servo control logic based upon a comparison of the width of the at least one of the plurality of write heads and the desired write head width, wherein the at least one of the plurality of write heads will not exceed the hard error rate when writing data.

11. The method of claim 10 in which the providing step (a) comprises:

(a1) selecting a hard error rate for a particular disk;

(a2) determining a desired write head width based upon the hard error rate.

12. The method of claim 11 in which the adjusting step (b) comprises:

(b1) comparing actual width of the at least one write head to the desired write head width; and (b2) adjusting the write inhibit window and the settle delay if the actual width is substantially different from the desired width.

13. The method of claim 12 wherein if the actual width is larger than the desired width the write inhibit window is increased and the settle delay is decreased.

14. The method of claim 12 wherein if the actual width is smaller than the desired width, the write inhibit window is decreased and the settle delay is increased.

15. A disk drive assembly comprising:

a plurality of write heads; and a servo control logic for controlling the plurality of write heads, the servo control system for providing a desired write head width based upon a hard error rate for each of the plurality of write heads; and adjusting at least one parameter of the servo control logic based upon a comparison of the width of each of the plurality of write heads and the desired write head width, wherein each of the plurality of write heads will not exceed the hard error rate when writing data, wherein the loss of data is minimized.

16. The disk drive assembly of claim 15 wherein the at least one parameter includes a plurality of parameters.

17. The disk drive assembly of claim 16 wherein the plurality of parameters include a write inhibit window and a settle delay.

18. The disk drive assembly of claim 17 wherein if the actual width is larger than the desired width the write inhibit window is increased and the settle delay is decreased.

19. The disk drive assembly of claim 17 wherein if the actual width is smaller than the desired width, the write inhibit window is decreased and the settle delay is increased.

20. A computer readable medium containing program instructions for minimizing the loss of data by a disk drive configuration, the disk drive configuration including at least one write head and a servo control logic, the program instructions comprising:
   (a) providing a desired write head width based upon a hard error rate; and
   (b) adjusting at least one parameter of the servo control logic based upon a comparison of the width of the at least one write head and the desired write head width, wherein the at least one write head will maintain the hard error rate when writing data.

21. The computer readable medium of claim 20 wherein the at least one parameter includes a plurality of parameters.

22. The computer readable medium of claim 21 wherein the plurality of parameters include a write inhibit window and a settle delay.

23. The computer readable medium of claim 20 in which the providing step (a) comprises:
   (a1) selecting a hard error rate for a particular disk;
   (a2) determining a desired write head width based upon the hard error rate.

24. The computer readable medium of claim 23 in which the adjusting step (b) comprises:
   (b1) comparing actual width of the at least one write head to the desired write head width; and
   (b2) adjusting the at least one parameter if the actual width is substantially different from the desired width.

25. The computer readable medium of claim 24 wherein the at least one parameter includes a plurality of parameters.

26. The computer readable medium of claim 25 wherein the plurality of parameters include a write inhibit window and a settle delay.

27. The computer readable medium of claim 26 wherein if the actual width is larger than the desired width the write inhibit window is increased and the settle delay is decreased.

28. The computer readable medium of claim 26 wherein if the actual width is smaller than the desired width, the write inhibit window is decreased and the settle delay is increased.

* * * * *